(12) United States Patent
Pratt (10) Patent No.: US 7,043,537 B1
(45) Date of Patent: May 9, 2006

(54) SYSTEM AND METHOD FOR REMOTE DEVICE MANAGEMENT

(75) Inventor: Richard W. Pratt, Danville, CA (US)

(73) Assignee: Cisco Technology, Inc, San Jose, CA (US)

( * ) Notice: Subject to any disclaimer, the term of this patent is extended or adjusted under 35 U.S.C. 154(b) by 419 days.

(21) Appl. No.: 08/924,785

(22) Filed: Sep. 5, 1997

(51) Int. Cl.
 G06F 15/177 (2006.01)

(52) U.S. Cl. ..................................... 709/220

(58) Field of Classification Search ............... 370/245, 370/453, 457; 709/223, 219, 220, 224, 201, 709/221; 380/25; 395/653; 717/103, 107, 717/118, 140; 710/104; 713/182; 707/119
See application file for complete search history.

(56) References Cited

U.S. PATENT DOCUMENTS

| | | | | |
|---|---|---|---|---|
| 5,287,103 A | | 2/1994 | Kasprzyk et al. | 340/825.52 |
| 5,311,595 A | | 5/1994 | Bjerrum et al. | 380/25 |
| 5,319,644 A | | 6/1994 | Liang | 370/85.5 |
| 5,361,250 A | | 11/1994 | Nguyen et al. | 370/16.1 |
| 5,367,635 A | | 11/1994 | Bauer et al. | 395/200 |
| 5,423,002 A | | 6/1995 | Hart | 395/200 |
| 5,613,120 A | * | 3/1997 | Palay et al. | 717/165 |
| 5,680,461 A | * | 10/1997 | McManis | 380/25 |
| 5,687,398 A | | 11/1997 | Martineau | 395/899 |
| 5,715,394 A | * | 2/1998 | Jabs | 395/200.53 |
| 5,729,744 A | | 3/1998 | Gerken et al. | 395/619 |
| 5,768,510 A | * | 6/1998 | Gish | 709/203 |
| 5,778,368 A | * | 7/1998 | Hogan et al. | 707/10 |
| 5,809,287 A | | 9/1998 | Stupek, Jr. et al. | 395/500 |
| 5,812,529 A | * | 9/1998 | Czarnik | 370/245 |
| 5,812,776 A | | 9/1998 | Gifford | 395/200.47 |
| 5,835,720 A | | 11/1998 | Nelson et al. | 395/200.54 |
| 5,835,727 A | | 11/1998 | Wong et al. | 395/200.68 |
| 5,835,911 A | * | 11/1998 | Nakagawa et al. | 707/203 |
| 5,838,683 A | | 11/1998 | Corley et al. | 370/408 |
| 5,838,916 A | * | 11/1998 | Domenikos | 709/219 |
| 5,857,074 A | | 1/1999 | Johnson | 395/200.47 |
| 5,857,102 A | * | 1/1999 | McChesney | 395/653 |
| 5,859,982 A | * | 1/1999 | Lindholm | 709/247 |
| 5,875,335 A | * | 2/1999 | Beard | 709/200 |

(Continued)

FOREIGN PATENT DOCUMENTS

WO 98/16051 4/1998

OTHER PUBLICATIONS

Microsoft Press Computer Dictionary, Third Edition pp. 15-16 and 493, 505, 1997.*

(Continued)

*Primary Examiner*—Beatriz Prieto
(74) *Attorney, Agent, or Firm*—Thelen Reid & Priest LLP; David B. Ritchie (57) ABSTRACT

A manufacturing method enables the manufacture of a remotely controlled network device management system. The manufacturing method includes the steps of obtaining a software program, obtaining a downloadable unit (e.g. an applet) configured to communicate with the software program, compiling the software program into a binary file, embedding the downloadable unit into the binary file, and loading the binary file with the embedded downloadable unit onto the network device. A management method enables a remote client to manage the network device. The management method includes the steps of receiving from a remote client a request to manage a software program which has a binary file with an embedded downloadable unit, locating the downloadable unit embedded in the binary file, extracting the downloadable unit from the binary file, and forwarding the downloadable unit to the remote client.

12 Claims, 6 Drawing Sheets

U.S. PATENT DOCUMENTS

| | | | |
|---|---|---|---|
| 5,887,139 A * | 3/1999 | Madison | 709/223 |
| 5,911,071 A * | 6/1999 | Jordan | 709/200 |
| 5,913,037 A | 6/1999 | Spofford et al. | 395/200.56 |
| 5,918,016 A | 6/1999 | Brewer et al. | 395/200.5 |
| 5,920,725 A * | 7/1999 | Ma et al. | 717/11 |
| 5,922,050 A * | 7/1999 | Madany | 709/222 |
| 5,956,732 A | 9/1999 | Tsuchida | 707/203 |
| 5,958,016 A | 9/1999 | Chang et al. | 709/229 |
| 5,974,454 A | 10/1999 | Apfel et al. | 709/221 |
| 5,999,740 A | 12/1999 | Rowley | 395/712 |
| 6,012,088 A | 1/2000 | Li et al. | 709/219 |
| 6,067,577 A * | 5/2000 | Beard | 709/305 |
| 6,074,434 A | 6/2000 | Cole et al. | 717/11 |
| 6,195,694 B1 * | 2/2001 | Chen et al. | 709/220 |

OTHER PUBLICATIONS

Newton's Telecom Dictionary, p. 96-97, by Harry Newton, Oct. 1998.*

Puntikov et al., "AVCS: The APL Version Control System", 1995, pp 154-161.

* cited by examiner

SYSTEM AND METHOD FOR REMOTE DEVICE MANAGEMENT

BACKGROUND OF THE INVENTION

1. Field of the Invention

This invention relates to computer networks, and more particularly provides a system and method for managing a network device from a remote client.

2. Description of the Background Art

The modern computer network is no longer contained within a single structure. Rather, it is mobile and geographically scattered. To accommodate the new network, network devices such as routers have been developed to interconnect computers regardless of computer location.

Management of the network has become increasingly complex as the number of attached computers increases. To enable remote reporting and configuration of these devices, network programmers developed the Simple Network Management Protocol (SNMP). SNMP provides an extensible means for interoperable equipment and management software to exchange data and instructions. However, SNMP incorporates cryptic commands and does not provide a remote user interface, a control paradigm that poorly matches the needs of the network manager. To resolve these difficulties, network programmers created proprietary interfaces to facilitate device management. Still, problems remain. For example, one problem relates to interface access capabilities from a remote site. If a network manager needs to manage a network device on the network from the remote site, a proprietary interface site component including supporting software must be installed at the remote site. This limits the locations from which management can occur and reduces the usefulness of the proprietary interface.

A second problem relates to the compatibility between the proprietary interface and the network device. For example, routers run an operating system such as the Internetwork Operating System (IOS) produced by Cisco, Inc. The IOS controls routing by finding optimal paths and redirecting traffic quickly around network failures. A network manager who wants to access the router to monitor such a failure must have software compatible with the version of the IOS running on the device. Additionally, each device may perform different tasks requiring the use of device-specific programs. Storing device-specific configuration and program files would not be a problem for a single network device. However, it is not feasible to maintain these files for the myriad of devices in most networks. Therefore, a system and method for using device-specific programs and configuration data to manage a network device from a remote site are needed.

SUMMARY OF THE INVENTION

In accordance with the present invention, a system for enabling remote management of a network device such as a web server, a router or any networked computer is provided. The system includes a remote client coupled via a communications channel to a network device. A software program controls the network device to perform an intended function (such as routing IP packets). To enable configuration and management of the software program, device-specific downloadable units (such as Java™ applets or Java™ classes) are embedded in the binary file of the software program. A downloadable unit is any unit of code that can be downloaded to a web engine for performing a particular function. A binary file is one that is in the format used for executable machine code. The remote client connects to the network device, retrieves a downloadable unit relating to a function desired from the binary file of the software program and then executes the downloadable unit.

Each embedded downloadable unit may contain a communicator component, an interface component and a configuration component. The communicator component establishes a communications channel from the remote client with the software program from which it was extracted. The interface component provides an interface such as a General User Interface (GUI) for enabling the user to communicate with the downloadable unit. The configuration component manages and configures the remote device or the software program thereon. One skilled in the art will appreciate that the remote client may retrieve the downloadable unit each time network device management is desired, thereby enabling the programmer to update available features, available control options or version information by modifying only the downloadable unit. Alternatively, remote client may store the downloadable unit (e.g., in cache) for continued management of the network device.

The present invention also provides a method for manufacturing a network device. The method includes the steps of including downloadable unit extraction code and communications code in a software program, compiling the software program to generate its binary file, embedding at least one device-specific downloadable unit in the binary file of software program, and loading the software program with the embedded downloadable unit onto the network device. The software program can then be executed. It will be appreciated that the downloadable units embedded in a software program will vary depending on the network device, the functions desired, the version of the software program, etc. To insure that the downloadable units are compatible, the downloadable units may be bundled together before being embedded in the binary file of the software program. For example, in a Java™ environment, an applet will be used to manage the network device and may comprise one or more Java™ classes bundled together. It will be appreciated that for the sake of efficiency, a default bundle comprising downloadable units to be shared by the other bundles may be embedded in the software program. For example, again in the Java™ environment, an applet may comprise classes in one bundle and classes in the default bundle.

The present invention also provides a method for configuring a network device from a remote client. Namely, the remote client contacts the network device using, for example, HyperText Transfer Protocol (HTTP). The network device provides the remote client with a web page listing the configurable software programs. However, if finer detail is desired, the web page may list configurable software program components or the like. The remote client selects one. Upon selection of a software program, the software program establishes a communications channel with the remote client and provides a list of available functions (services) corresponding to downloadable units embedded therein to the remote client. Alternatively, the list of software programs and functions may be illustrated in a single web page. The remote client requests a function. The software program locates and forwards the corresponding downloadable unit to the remote client. The remote client can then execute the downloadable unit.

For example, the remote client may want to prevent a router from processing requests from a particular IP address.

A user of the remote client can hyperlink to the web page provided by the network device. The user selects the IOS software program currently running on the device. The IOS forwards a web page listing available functions including IP address routing management to the remote client. The user selects the routing management function, which causes the IOS to locate, extract and forward to the remote client a downloadable unit to perform routing management. The remote client then executes the downloadable unit. Accordingly, the downloadable unit communicator component establishes a communications channel with the software program. The downloadable unit interface component allows the user to interact with the downloadable unit. The downloadable unit configuration component communicates with the software program to configure the software program. Those skilled in the art recognize that the separation of these components may be purely logical. Those skilled in the art will also recognize that each component may comprise a separate downloadable unit or multiple downloadable units.

Enabling a remote client to download a software management mechanism directly from the software program enables a network manager to have the most up-to-date network device management software and the most up-to-date functions. This also insures that the network device management software is compatible with the version of the software program running on the network device. Users need not maintain configuration files for each network device on their local data storage. Further, to update or improve the available functions, a revised downloadable unit may be embedded in the binary file of the software program. The user need not independently obtain the new network device management software since it is readily available from the network device. The user need not independently obtain new network device management software each time the software program running on the device is updated.

DETAILED DESCRIPTION OF THE PREFERRED EMBODIMENT

Figure 1:
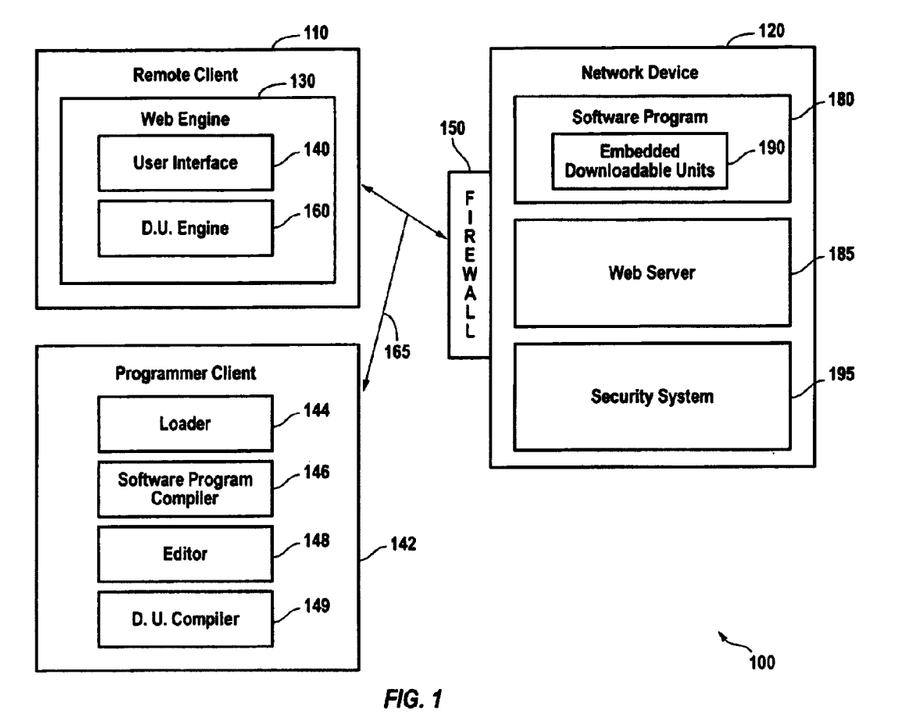
FIG. 1 is a block diagram illustrating an example device management system according to the present invention.

FIG. 1 is a block diagram illustrating a device management system 100. The system 100 includes a remote client 110, a programmer client 142 and a network device 120, each coupled together via a communications channel 165. The communications channel 165 can be a direct connection through a direct connect cable, an internet connection, or any other means of intercommunication. The system 100 may further include a firewall 150 coupled between the communications channel 165 and the network device 120 for protecting the network device 120 from external threats and unprivileged communications.

The remote client 110 includes a web engine 130 for communicating with the network device 120. The web engine 130 includes a Downloadable Unit (DU) engine 160, such as a Java™ Virtual Machine (JVM) emulator, for reading and executing downloadable units. A downloadable unit is a unit of downloadable and executable or interpretable program such as Java™ applets, Java™ classes or ActiveX™ control for performing a specific function such as generating a report in a distributed environment. The web engine 130 further includes a user interface 140 for displaying web page data such as images and text retrieved via the communications channel 165. An example of a web engine 130 includes the Netscape™ web browser produced by the Netscape Corporation, the Internet Explorer™ web browser produced by the Microsoft Corporation and the Java™ Developers Kit 1.0 web browser produced by Sun Microsystems, Inc. Those skilled in the art know that although the downloadable unit engine 160 is described as being part of the web engine 130, the downloadable unit engine 160 could be run as a separate engine.

The programmer client 142 includes a loader 144, a software program compiler 146, an editor 148 and a downloadable unit compiler 149. The software program compiler 146 compiles a software program 180 into machine code or executable code to create a binary file. The downloadable unit compiler 149 compiles the downloadable unit 190 into a format executable by the downloadable unit engine 160. For example, the Java™ Developers Kit (JDK) produced by Sun Microsystems, Inc. compiles Java™ applets into partially interpreted code, or bytecode. The editor 148 enables a programmer to embed downloadable units into the binary file of the software program 180. The loader 144 loads the binary file with the embedded downloadable units onto the network device 120 via the communications channel 165.

The network device 120 includes a web server 185, a security system 195 and a software program 180 for controlling the network device 120 to perform a specific function such as routing IP packets. The software program 180 can be the operating system of the network device 120 (e.g., the IOS running on a router) or any program that helps operate or configure the network device 120. Although the system 100 is being described as including only a single network device 120, those skilled in the art will recognize that any number of network devices 120 can be managed using the present invention. The software program 180 manages the network device 120 and may be the operating system or platform for other programs executed by the network device 120. The software program 180 contains an embedded downloadable units 190 that the software program 180 can extract and the web server 185 can transmit. The embedded downloadable units 190 may include code for requesting other URLs, for opening new sockets, or for performing a variety of other network management tasks.

The security system 195 protects the network device 120 from unauthorized communications. Before obtaining access to software program 180 including corresponding network management functions, the remote client 110 must first obtain authorization from the security system 195.

Obtaining authorization typically requires user identification and authentication. Once authenticated, the remote client 110 is provided access.

The web server 185 handles web requests from the web engine 130 of the remote client 110. For example, if the user interface 140 receives a hyperlink request from a user, then the web engine 130 sends a uniform resource locator (URL) address via the communications channel 165 to the web server 185. The web server 185 locates the requested web page data file and transmits it back over the communications channel 165 to the web engine 130. Upon receipt, the web engine 130 loads the web page data file and uses the user interface 140 to display the web page including any text or images. The file may include a list of available software programs 180 that may be managed remotely.

Selection of a software program 180 causes the web server 185 to retrieve available functions for managing the network device 120. More particularly, the web server 185 instructs the software program 180 to extract a list of available functions (FIG. 3, 315) embedded in the binary file of the software program 180. The list may contain hotlinks referencing the corresponding device-specific downloadable units 190. The web engine 130 enables the selection of one of the functions. Accordingly, the software program 180 sends web page data having downloadable unit tags referencing downloadable units 190 to be executed by the downloadable unit engine 160. The web engine 130 forwards a downloadable unit tag to the network device 120. The software program 180 searches through its own binary file to locate the corresponding downloadable unit 190, and sends the located downloadable unit 190 back via the communications channel 165 to the web engine 130. The downloadable unit engine 160 executes the downloadable unit 190 thereby enabling configuration of the network device 120 and the software program 180 from which the downloadable unit 190 was retrieved.

Figure 2:
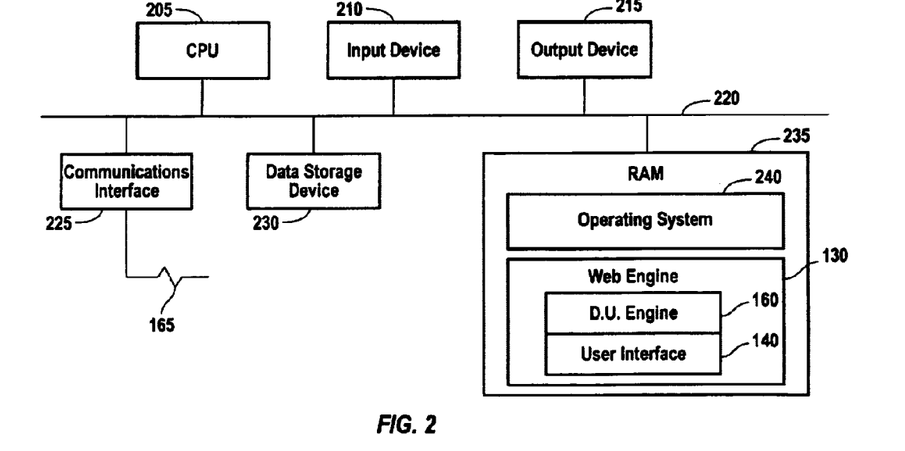
FIG. 2 is a block diagram illustrating the details of the remote client of the device management system of FIG. 1.

FIG. 2 is a block diagram illustrating details of the remote client 110, which includes a CPU 205, an input device 210, an output device 215, a communications interface 225, a data storage device 230 and Random Access Memory (RAM) 235, each coupled to a signal bus 220. The communications interface 225 is coupled to the communications channel 165.

An operating system 240 includes a program for controlling processing by the CPU 205, and is typically stored in the data storage device 230 and loaded into the RAM 235 (as illustrated) for execution. The web engine 130, which includes the downloadable unit engine 160 and the user interface 140, may also be stored in the data storage device 230 before being loaded into the RAM 235 (as illustrated) for execution. The user interface 140 provides, for example, a display window to enable communication via the output device 215 and the input device 210 between the user and the applet 190 retrieved from the network device 120. Accordingly, the user can send a request or command to the downloadable unit 190. The downloadable unit 190 will forward the request to the software program 180 of the network device 120.

Although the remote client 110 has been described as having a data storage device 230 and an operating system 240, other clients 110 such as Java™ terminals that do not have these components can alternatively be used. These clients 110 can obtain the necessary data such as other downloadable units 190 and will execute them directly from RAM 235.

Figure 3:
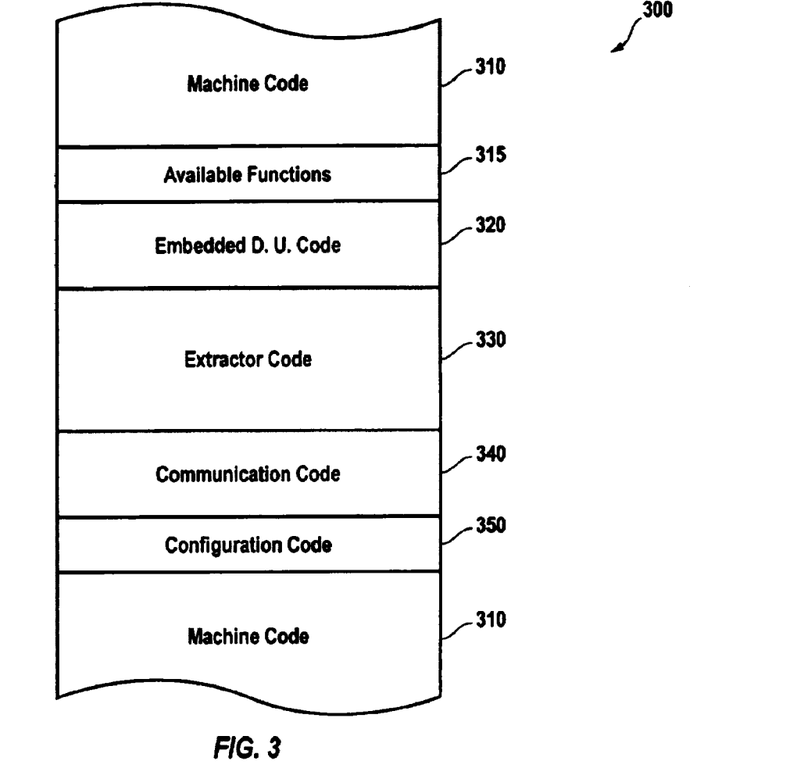
FIG. 3 is a block diagram illustrating the binary file of the software program after an applet has been embedded.

FIG. 3 is a block diagram illustrating the binary file 300 of the software program 180 after the downloadable units 190 have been embedded. The binary file 300 comprises machine code 310, available functions 315, embedded downloadable unit code 320, extractor 330, communication code 340 and configuration code 350. Machine code 310 is code that has been compiled into machine language and is executed during the running of the software program 180. The downloadable unit code 320 may be in a different language than the binary language of the machine code 310. For example, the downloadable unit code 320 may be partially interpreted code called bytecode, such as Java™ bytecode, which is interpretable by the downloadable unit engine 160. The available functions 315, extractor code 330, communication code 340 and configuration code 350 may be written in machine code. It will be appreciated that the downloadable unit code 320 is embedded in the binary file 300 so that the downloadable units 190 can be extracted from the software program 180 while the software program 180 is executing.

The binary file 300 further contains extractor code 330 for extracting the list of available functions 315 and downloadable unit code 320 from the binary file 300. When a software program 180 is selected, the extractor code 330 retrieves and delivers the corresponding list of available functions 315 to the web server 185 for forwarding to the remote client 110. When a function request is received from the remote client 110, the extractor code 330 searches through the binary file 300, examines a table of contents for each embedded downloadable unit bundle and extracts the appropriate downloadable unit code 320 corresponding to the requested function. The extractor code 330 then sends the extracted downloadable unit 190 to the remote client 110. The communication machine code 340 interprets commands from the downloadable unit 190 currently executing by the downloadable unit engine 160 on the remote client 110, and further enables communications between the software program 180 and the downloadable unit 190. The configuration code 350 performs the services requested via the downloadable unit 190 from the remote client 110. Although the list of available functions 315, the extractor code 330, the communications code 340 and configuration code 350 are each being described as part of the binary file 300, each could be stored anywhere on any device within the system 100.

Figure 4:
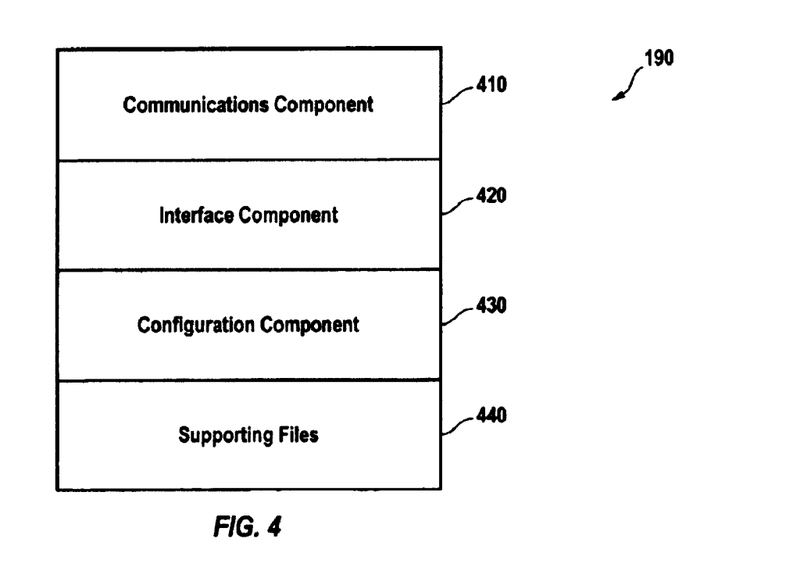
FIG. 4 is a block diagram of an example downloadable unit.

FIG. 4 is a block diagram illustrating an example downloadable unit 190 to be embedded in a binary file 300 of a software program 180 of a network device 120. The downloadable unit 190 includes a communications component 410, an interface component 420, a configuration component 430, and any supporting files 440 such as other downloadable units that are needed to run these components 410–430. The communications component 410 establishes a communications link between the remote client 110 and the communication code 340 of the binary file 300 from which it was extracted. The interface component 420 uses the user interface 140 to enable the user to communicate with the binary file 300. For example, the user interface 140 in coordination with the executing downloadable unit 190 enables the user to send function requests or commands to the binary file 300 and to receive status information back from the binary file 300. It will be appreciated that the interface component 420 may create a separate window, a pop-up menu or the like. The configuration component 430 of the downloadable unit 190 in cooperation with the communications code 340 and configuration code 350 of the binary file 300 include the "interface" for enabling management of the network device 120.

It will be appreciated that although the example downloadable unit 190 has been described as a single downloadable unit 190, those skilled in the art know that each component 410, 420, 430, or 440 could be a separate downloadable unit 190 or multiple downloadable units 190. Accordingly, the downloadable unit 190 could be viewed as several downloadable units bundled together.

Figure 5:
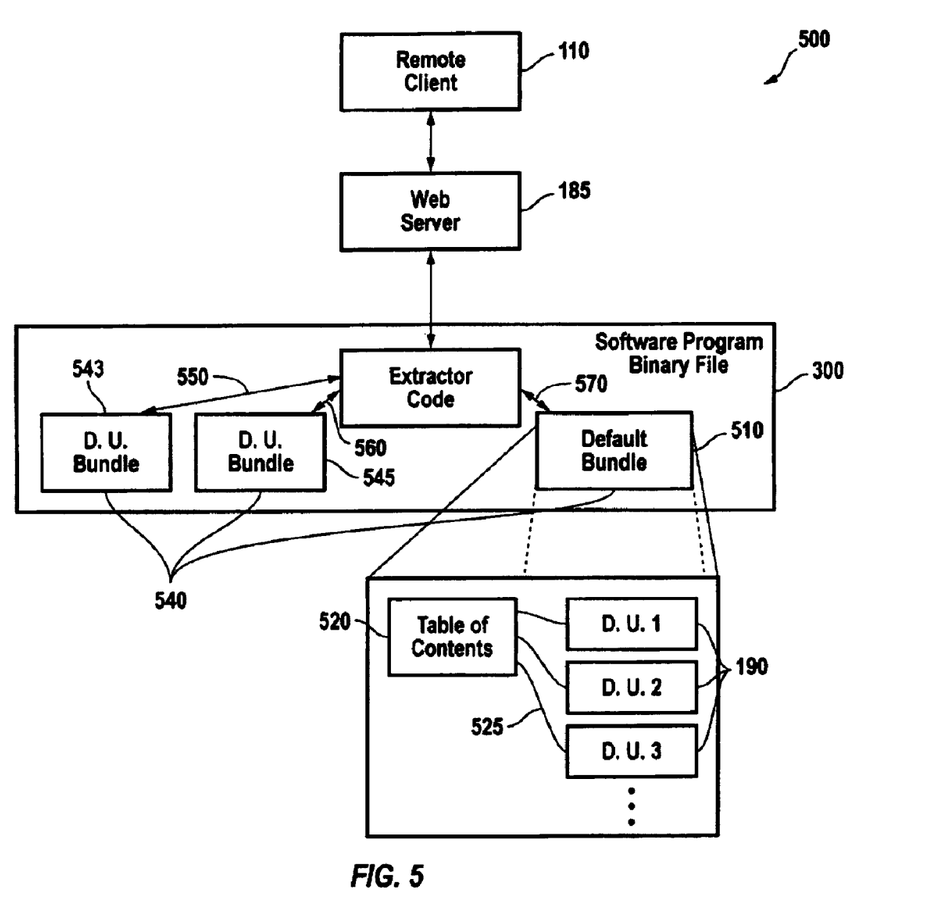
FIG. 5 is a block diagram illustrating a downloadable unit bundle search system.

FIG. 5 is a block diagram illustrating a downloadable unit 190 search system 500 with the arrows indicating communication of the system components. The remote client 110 generates an HTTP request and sends it via the communications channel 165 to the web server 185. The web server 185 delivers web page data including a list of the available functions 315 via the communications channel 165 back to the remote client 110. The remote client 110 selects a function from the list. The web server 185 receives and forwards the selected function to the binary file 300 of the software program 180. The software program 180 forwards a web page specifying which downloadable unit to launch. The remote client 110 requests the downloadable unit.

The extractor code 330 searches through each of the downloadable unit bundles 540 until it locates the downloadable unit 190 corresponding to the selected function. A downloadable unit bundle 540 includes downloadable units 190 grouped together based on predetermined criteria, such as version or functionality. For example, one bundle 540 may contain downloadable units 190 that help generate status reports. Each downloadable unit bundle 540 preferably includes a table of contents 520 that identifies each of the downloadable units 190 contained therein.

More particularly, the extractor code 330 begins by examining the table of contents 520 of the downloadable unit bundle 543 or downloadable unit bundle 545 in search of the downloadable unit 190 corresponding to the selected function. If the downloadable unit 190 is located in one of the bundle 543 or the bundle 545, then the extractor code 330 extracts the downloadable unit 190. Otherwise, as illustrated by arrow 570, the extractor code 330 searches the default bundle 510. The default bundle 510 contains default downloadable units 190, which are shared by the available functions 315. The default bundle 510 also includes a table of contents 520 that contains a list of the downloadable units contained therein. The extractor code 330 extracts the default downloadable unit 190 from bundle 510. The extractor code 330 then sends the located downloadable unit 190 to the web server 185, which transmits it to the remote client 110. This search method is repeated for support files 440 that the transmitted downloadable unit 190 requires.

Figure 6:
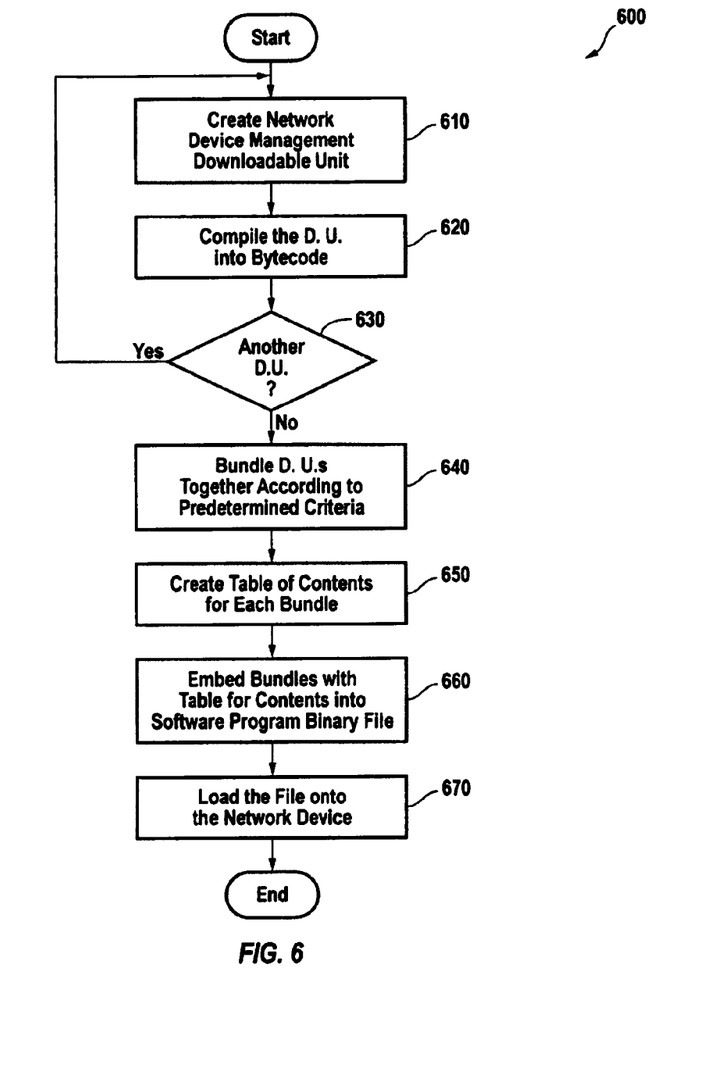
FIG. 6 is a flowchart illustrating the method of embedding management downloadable units according to the present invention.

FIG. 6 is a flowchart illustrating a method 600 for embedding downloadable unit bundles 540 in a software program 180 on a network device 120. The method 600 begins in step 610 with a programmer developing a network device management downloadable unit 190. A downloadable unit compiler 149 in step 620 compiles the downloadable unit into a format executable by the downloadable unit engine 160, for example, into partially interpreted code or bytecode. In step 630, a determination is made whether more downloadable units 190 will be embedded into the software program 180. If so, then the method 600 returns to step 610. Otherwise, the programmer in step 640 bundles the downloadable units 190 together according to predetermined criteria such as like versions or like functions or as a single downloadable unit bundle 540.

The downloadable unit compiler 149 in step 650 creates a table of contents 520 for each downloadable unit bundle 540. The table of contents 520 contains a list of the downloadable units 190 in the bundle and points to the location of the downloadable unit 190 in the bundle 540, for example, using an offset 525. The editor 148 in step 660 enables the programmer to embed the bundles 540 including the table of contents 520 into the binary file 300 of the software program 180. A loader 144 in step 670 loads the binary file 300 having the embedded bundles 540 onto the network device 120. Method 600 then ends.

Figure 7:
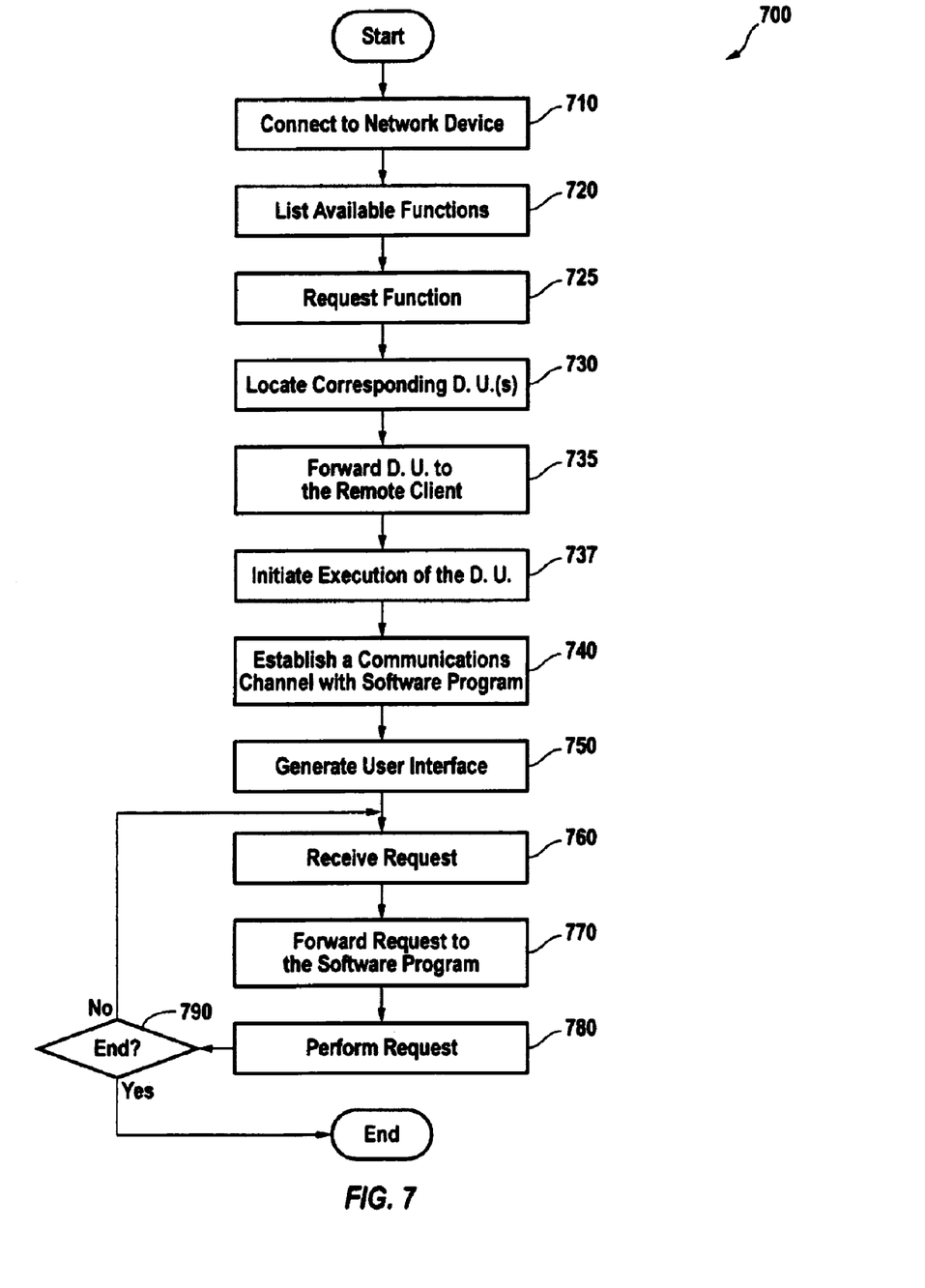
FIG. 7 is a flowchart illustrating the method of remotely managing a network device according to the present invention.

FIG. 7 is a flowchart illustrating a method 700 for managing a network device 120 remotely. The method 700 begins in step 710 with the remote client 110 connecting to the network device 120. The web server 185 in step 720 retrieves the list of available functions 315 for a selected software program 180 and forwards them to the remote client 110, and the remote client 110 displays the list. The remote client 110 in step 725 requests a function corresponding to an embedded downloadable unit 190 configured to perform the requested function and forwards the requested function to the software program 180.

The software program 180 in step 730 forwards a web page specifying which downloadable unit to launch, and the remote client 110 requests the downloadable unit. The extractor code 330 of the binary file 300 still in step 730 locates the corresponding downloadable unit 190 using the method described in FIG. 5 and delivers the located downloadable unit 190 (possibly the default downloadable unit 190) to the web server 185. The web server 185 in step 735 forwards the downloadable unit 190 to the remote client 110. The downloadable unit engine 160 in step 737 initiates execution of the downloadable unit 190.

The communicator component 410 in step 740 establishes a communications channel with the communication code 340. The interface component 420 in step 750 provides a user interface 140 that allows the user to interact directly with the downloadable unit 190. The interface component 420 in step 760 receives function-related requests from the remote client 110. It will be appreciated that the function-related requests may include configuration requests (such as requests that alter the selected function of the software program 180 or network device 120), performance requests (such as requests for the generation of status reports) or other informational requests. The configuration component 430 in step 770 forwards the function-related requests to the software program 180. Note that the forwarded request may be a translation or set of commands for performing the request. In step 780, the communications code 340 interprets and the configuration code 350 performs the function-related request. In step 790, a determination is made whether to end. If so, then method 700 ends. Otherwise, method 700 returns to step 760 for receiving additional requests.

Figure 8:
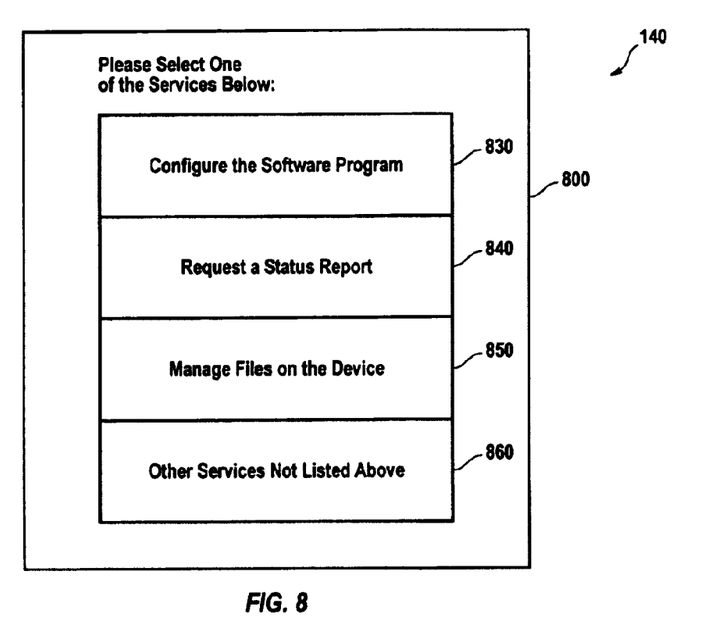
FIG. 8 is block diagram of an example of a user interface.

FIG. 8 is a block diagram of an example user interface 140 displayed by web engine 130. The illustrated user interface 140 includes a display window 800 listing different management functions 830–860 available to the remote client 110. The functions 830–860 include configuring the software program 830 (such as granting access to outside users or opening a port on the network device 120), requesting a status report 840 (such as transmitting a file containing the names of users that are currently using the network device 120), managing files on the device 850 (such as deleting or renaming stored files) and other services not listed 860. The remote client 110 can access this page over any standard web engine 130, and can select from these functions 830–860. Upon selection of a function, the corresponding downloadable unit 190 will be transmitted to the remote client 110. Execution of the corresponding downloadable unit 190 will cause the downloadable unit 190 to display another display window listing a variety of tasks as described above with reference to FIG. 7.

Figure 9A:
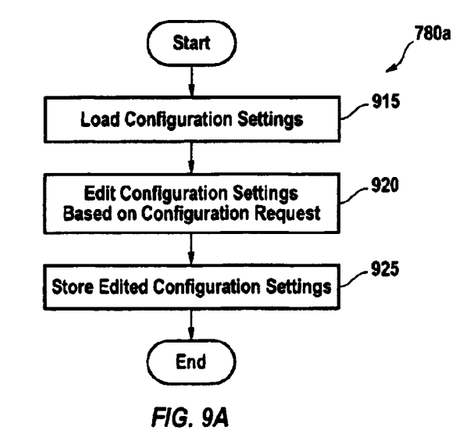
FIG. 9a is a flowchart illustrating the method for processing a configuration request by the software program.

FIG. 9a is a flowchart illustrating further details of step 780 (FIG. 7) in a first embodiment, referred to herein as method 780a. The method 780a begins with the configuration code 350 in step 915 loading current configuration settings which may include security settings, such as passwords and firewall settings, or any other settings that control the software program 180 or network device 120. Step 915 further includes forwarding the configuration settings to the configuration component 430 of the downloadable unit 190. The configuration component 430 in step 920 enables editing of these configuration settings, which could include modification of a copy on the remote client 120 or which could involve direct modification of the software program binary file 300. If modifying the copy, then in step 925 the configuration component 430 sends and the configuration code 350 stores the edited configuration settings back onto the network device 120. Method 780a then ends.

Figure 9B:
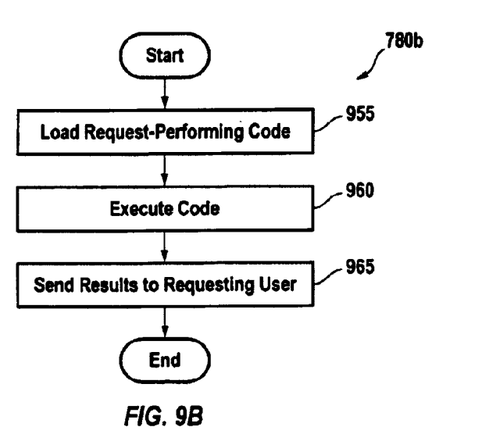
FIG. 9b is a flowchart illustrating the method for processing a performance request by the software program.

FIG. 9b is a flowchart illustrating further details of step 780 (FIG. 7) in a second embodiment, referred to herein as method 780b. Method 780b begins with the communications code 340 in step 955 loading the configuration code 350 that can perform the request. The configuration code 350 could be a downloadable unit 190 that is part of or external to the software program 180. For example, if a remote client 110 requests a status report, the communications code 340 could load a specific status program 350 that generates a status report about each of the network devices 120. The configuration code 350 in step 960 executes the request and in step 965 forwards the results of the request to the remote client 110. The results may include information such as a status report or may include a confirmation that the request was successfully executed.

The invention has been explained above with reference to a preferred embodiment. Although the system and method have been described as managing an operating system 140, the system and method may be used to manage any software or software configurable component. Although selection of the software program 180 and the desired function request have been described as performed by a user, one skilled in the art is aware that selection may be performed by a computer or other system. Other embodiments will be apparent to those skilled in the art in light of this disclosure. Therefore, any variations upon the preferred embodiments are covered by the present invention, which is limited only by the appended claims.

What is claimed is:

1. A method for modifying available remote device management services of a network device, the method comprising:
obtaining a new downloadable unit for performing a new service, the new downloadable unit including:
a communicator component for establishing a communications channel between a remote client and the network device,
an interface component for enabling the remote client to communicate with the new downloadable unit, and
a configuration component for managing the network device;
retrieving a network device control software program binary file having an embedded old downloadable unit for performing an old service from the network device;
substituting the old downloadable unit with the new downloadable unit; and
loading the network device control software program binary file having the new downloadable unit embedded in the binary file onto the network device,
wherein the network device control software program is executed by the network device.

2. A computer-readable medium having stored thereon computer-executable instructions for performing a method of modifying available remote device management services of a network device, the method comprising:
obtaining a new downloadable unit for performing a new service, the new downloadable unit including:
a communicator component for establishing a communications channel between a remote client and the network device,
an interface component for enabling the remote client to communicate with the new downloadable unit, and
a configuration component for managing the network device;
retrieving a network device control software program binary file having an embedded old downloadable unit for performing an old service from the network device;
substituting the old downloadable unit with the new downloadable unit; and
loading the network device control software program binary file having the new downloadable unit embedded in the binary file onto the network device,
wherein the network device control software program is executed by the network device.

3. An apparatus for modifying available remote device management services of a network device, the apparatus comprising:
means for obtaining a new downloadable unit for performing a new service, the new downloadable unit including:
a communicator component for establishing a communications channel between a remote client and the network device,
an interface component for enabling the remote client to communicate with the new downloadable unit, and
a configuration component for managing the network device;
means for retrieving a network device control software program binary file having an embedded old downloadable unit for performing an old service from the network device;
means for substituting the old downloadable unit with the new downloadable unit; and
means for loading the network device control software program binary file having the new downloadable unit embedded in the binary file onto the network device,
wherein the network device control software program is executed by the network device.

4. The apparatus as defined in claim 3, wherein the network device includes a network router.

5. The apparatus as defined in claim 3, wherein the new downloadable unit includes more than one new downloadable unit.

6. The apparatus as defined in claim 5, wherein the new downloadable units have been combined into downloadable unit bundles.

7. The apparatus as defined in claim 6, wherein the new downloadable units have been combined into downloadable unit bundles according to downloadable unit function.

8. The apparatus as defined in claim 6, wherein the new downloadable units have been combined into downloadable unit bundles according to version information.

9. The apparatus as defined in claim 3, wherein the network device control software program includes an operating system.

10. The apparatus as defined in claim 9, wherein the network device includes a router.

11. The apparatus as defined in claim 3, wherein the network device control software program includes a list of available management services.

12. The apparatus as defined in claim 11, further comprising a downloadable unit for each of the available management services.

* * * * *